United States Patent
Boudreau et al.

(10) Patent No.: US 10,171,879 B2
(45) Date of Patent: Jan. 1, 2019

(54) CONTEXTUAL ALERTING FOR BROADCAST CONTENT

(71) Applicant: International Business Machines Corporation, Armonk, NY (US)

(72) Inventors: Michael K. Boudreau, Orange, CA (US); Jia Chen, Ossining, NY (US); Sarbajit K. Rakshit, Kolkata (IN); Craig M. Trim, Sylmar, CA (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 0 days.

(21) Appl. No.: 15/284,779

(22) Filed: Oct. 4, 2016

(65) Prior Publication Data

US 2018/0098127 A1     Apr. 5, 2018

(51) Int. Cl.
| | |
|---|---|
| *H04N 7/16* | (2011.01) |
| *H04N 21/472* | (2011.01) |
| *H04N 21/8549* | (2011.01) |
| *H04N 21/44* | (2011.01) |
| *H04N 21/431* | (2011.01) |

(52) U.S. Cl.
CPC ... *H04N 21/47214* (2013.01); *H04N 21/4318* (2013.01); *H04N 21/44008* (2013.01); *H04N 21/8549* (2013.01)

(58) Field of Classification Search
CPC ......... H04N 21/47214; H04N 21/4318; H04N 21/8549; H04N 21/44008
See application file for complete search history.

(56) References Cited

U.S. PATENT DOCUMENTS

| | | | | |
|---|---|---|---|---|
| 5,434,678 A | * | 7/1995 | Abecassis | A63F 13/10 |
| | | | | 348/E5.102 |
| 5,583,576 A | * | 12/1996 | Perlman | H04N 5/44 |
| | | | | 348/E5.096 |
| 6,112,186 A | * | 8/2000 | Bergh | G06F 17/30699 |
| | | | | 705/14.37 |
| 6,181,364 B1 | * | 1/2001 | Ford | H04N 7/088 |
| | | | | 348/460 |

(Continued)

FOREIGN PATENT DOCUMENTS

WO     2003055215 A1    7/2003

OTHER PUBLICATIONS

Anonymous; Mobile Virtual Learning Companion; Feb. 16, 2007.

(Continued)

*Primary Examiner* — Michael B. Pierorazio
(74) *Attorney, Agent, or Firm* — Garg Law Firm, PLLC; Christopher K. McLane

(57) ABSTRACT

After receiving a content at a device usable to present the content to a user, a portion of the received content is analyzed to identify a context present in the portion, the context including a type of a subject-matter of the portion. A contextual rating rule corresponding to the context of the portion is selected from a set of contextual rating rules. A rating value of the portion is computed using a first rating value in the contextual rating rule, the rating value of the portion being distinct from a rating associated with the content by a distributor of the content. The portion is presented on a presentation device along with the rating value of the portion.

16 Claims, 5 Drawing Sheets

(56) References Cited

U.S. PATENT DOCUMENTS

| | | | | |
|---|---|---|---|---|
| 7,117,518 B1* | 10/2006 | Takahashi | ......... | G06F 17/30867 348/E5.105 |
| 7,430,360 B2* | 9/2008 | Abecassis | ............. | G11B 19/02 348/E5.105 |
| 2004/0123135 A1* | 6/2004 | Goddard | ............... | H04N 7/163 726/27 |
| 2005/0086069 A1* | 4/2005 | Watson | ............. | H04N 21/4508 726/3 |
| 2006/0110136 A1* | 5/2006 | Abecassis | ............... | G11B 7/14 386/261 |
| 2007/0124756 A1* | 5/2007 | Covell | ............. | G06F 17/30743 725/18 |
| 2007/0157247 A1* | 7/2007 | Cordray | ............... | G06F 3/0481 725/47 |
| 2007/0271580 A1* | 11/2007 | Tischer | ................. | H04H 60/07 725/35 |
| 2008/0155614 A1* | 6/2008 | Cooper | .................. | G06F 21/10 725/91 |
| 2009/0034426 A1* | 2/2009 | Luft | .................... | H04L 41/5009 370/252 |
| 2009/0133051 A1* | 5/2009 | Hildreth | ............... | H04N 5/4403 725/28 |
| 2009/0138805 A1* | 5/2009 | Hildreth | ............. | G06K 9/00335 715/745 |
| 2009/0164655 A1* | 6/2009 | Pettersson | ........... | H04L 65/4015 709/231 |
| 2009/0172757 A1* | 7/2009 | Aldrey | .................... | H04N 7/165 725/110 |
| 2009/0181354 A1* | 7/2009 | Dasgupta | ................. | G09B 7/02 434/350 |
| 2010/0058400 A1* | 3/2010 | Nicas | ..................... | H04N 7/165 725/74 |
| 2010/0120008 A1* | 5/2010 | McDonagh | ............. | G09B 7/00 434/323 |
| 2010/0122293 A1* | 5/2010 | Craner | ............... | H04N 5/44582 725/40 |
| 2010/0131385 A1* | 5/2010 | Harrang | ................. | G06Q 30/00 705/26.1 |
| 2010/0250672 A1* | 9/2010 | Vance | ................. | G06Q 10/109 709/204 |
| 2011/0034242 A1* | 2/2011 | Aronzon | ................ | A63F 13/79 463/29 |
| 2011/0099572 A1* | 4/2011 | Craner | ................. | H04N 7/163 725/25 |
| 2011/0154385 A1* | 6/2011 | Price | ...................... | H04H 60/45 725/12 |
| 2011/0193971 A1* | 8/2011 | Lin | .......................... | H04N 7/18 348/207.1 |
| 2011/0283189 A1* | 11/2011 | McCarty | ............ | H04N 5/44543 715/707 |
| 2012/0075168 A1* | 3/2012 | Osterhout | ............ | G02B 27/017 345/8 |
| 2012/0110616 A1* | 5/2012 | Kilar | .................... | H04N 21/812 725/32 |
| 2012/0117103 A1* | 5/2012 | Farrelly | ............ | G06F 17/30091 707/769 |
| 2012/0192234 A1* | 7/2012 | Britt | ........................ | H04N 5/782 725/58 |
| 2012/0324550 A1* | 12/2012 | Wasilewski | ............. | G06F 21/10 726/5 |
| 2013/0014136 A1* | 1/2013 | Bhatia | .................. | H04N 21/252 725/9 |
| 2013/0254795 A1* | 9/2013 | Botta | .................. | H04N 21/4751 725/28 |
| 2014/0007150 A1* | 1/2014 | Bhide | .................. | H04N 21/454 725/14 |
| 2014/0208340 A1* | 7/2014 | Poornachandran | .......................... | H04N 21/44218 725/10 |
| 2014/0359647 A1* | 12/2014 | Shoemake | ......... | H04N 5/23206 725/10 |
| 2015/0026708 A1* | 1/2015 | Ahmed | .............. | H04N 5/23206 725/12 |
| 2015/0070516 A1* | 3/2015 | Shoemake | ....... | H04N 21/42203 348/207.11 |
| 2015/0309687 A1* | 10/2015 | Herigstad | .......... | H04N 21/4126 715/784 |
| 2016/0323643 A1* | 11/2016 | Panchaksharaiah | ......................... | H04N 21/44016 |

OTHER PUBLICATIONS

Paun; Methods, Systems and Media for Prompting Influential Users to Promote Content, May 15, 2014.

Anonymous; System, method or apparatus for exchanging knowledge, information, products or any entity(ies) of value, and real time market and/or individual sensitive or responsive system of education, Jan. 1, 2009. https://www.princeton.edu/futureofchildren/publications/docs/18_01_03.pdf.

Kirkorian et al; Media and Young Children's Learning, vol. 18 / No. 1 / Spring 2008, www.futureofchildren.org.

Swanson; Preschoolers Can Learn Great Things From TV, Apr 20, 2013. http://www.huffingtonpost.com/wendy-sue-swanson-md-mbe-faap/tv-for-preschoolers_b_2704097.html?ir=India&adsSiteOverride=in.

* cited by examiner

CONTEXTUAL ALERTING FOR BROADCAST CONTENT

TECHNICAL FIELD

The present invention relates generally to a method, system, and computer program product for rating broadcast content and notifying about the rated content. More particularly, the present invention relates to a method, system, and computer program product for contextual alerting for broadcast content.

BACKGROUND

Hereinafter, a broadcast content, or simple "content", is a reference to content received over any broadcast media, such as but not limited to televised content or the content of a radio broadcast, unless expressly disambiguated where used.

A context of a content is a subject-matter to which the content relates. A context can be as broad as an entire genre or as narrow as the presence or absence of specific themes, activities, settings, persons, places, or things.

Broadcast content includes material that may be particularly suitable, or particularly unsuitable, for various audience. For example, some content is educational or offers learning or growth opportunities for children, whereas other content may include language of themes unsuitable for children.

Presently, an industry-wide rating system is used to indicate to the audience the nature of the content that is about to be received. A provider of the content applies a rating value to the content according to this rating system. A receiver of the content, such as a family of users, presently take guidance from the provider-supplied rating value to determine the suitability of the content for the various users in the family.

Presently, content blocking and unblocking technology exists, which also locks out access to certain content, unlocks access to certain other content, depending upon the rating values. Particularly, a user, such as a parent, selects those rating values that the user does not want other users, such as a child in the family, to be able to access. Such features are commonly known as "parental locks".

SUMMARY

The illustrative embodiments provide a method, system, and computer program product. An embodiment includes a method that analyzes, after receiving a content at a device usable to present the content to a user, a portion of the received content to identify a context present in the portion, the context comprising a type of a subject-matter of the portion. The embodiment selects, corresponding to the context of the portion, a contextual rating rule from a set of contextual rating rules. The embodiment computes a rating value of the portion using a first rating value in the contextual rating rule, the rating value of the portion being distinct from a rating associated with the content by a distributor of the content. The embodiment presents, on a presentation device, the portion with the rating value of the portion.

An embodiment includes a computer usable program product. The computer usable program product includes one or more computer-readable storage devices, and program instructions stored on at least one of the one or more storage devices.

An embodiment includes a computer system. The computer system includes one or more processors, one or more computer-readable memories, and one or more computer-readable storage devices, and program instructions stored on at least one of the one or more storage devices for execution by at least one of the one or more processors via at least one of the one or more memories.

BRIEF DESCRIPTION OF THE DRAWINGS

The novel features believed characteristic of the invention are set forth in the appended claims. The invention itself, however, as well as a preferred mode of use, further objectives and advantages thereof, will best be understood by reference to the following detailed description of the illustrative embodiments when read in conjunction with the accompanying drawings, wherein:

DETAILED DESCRIPTION

Figure 1:
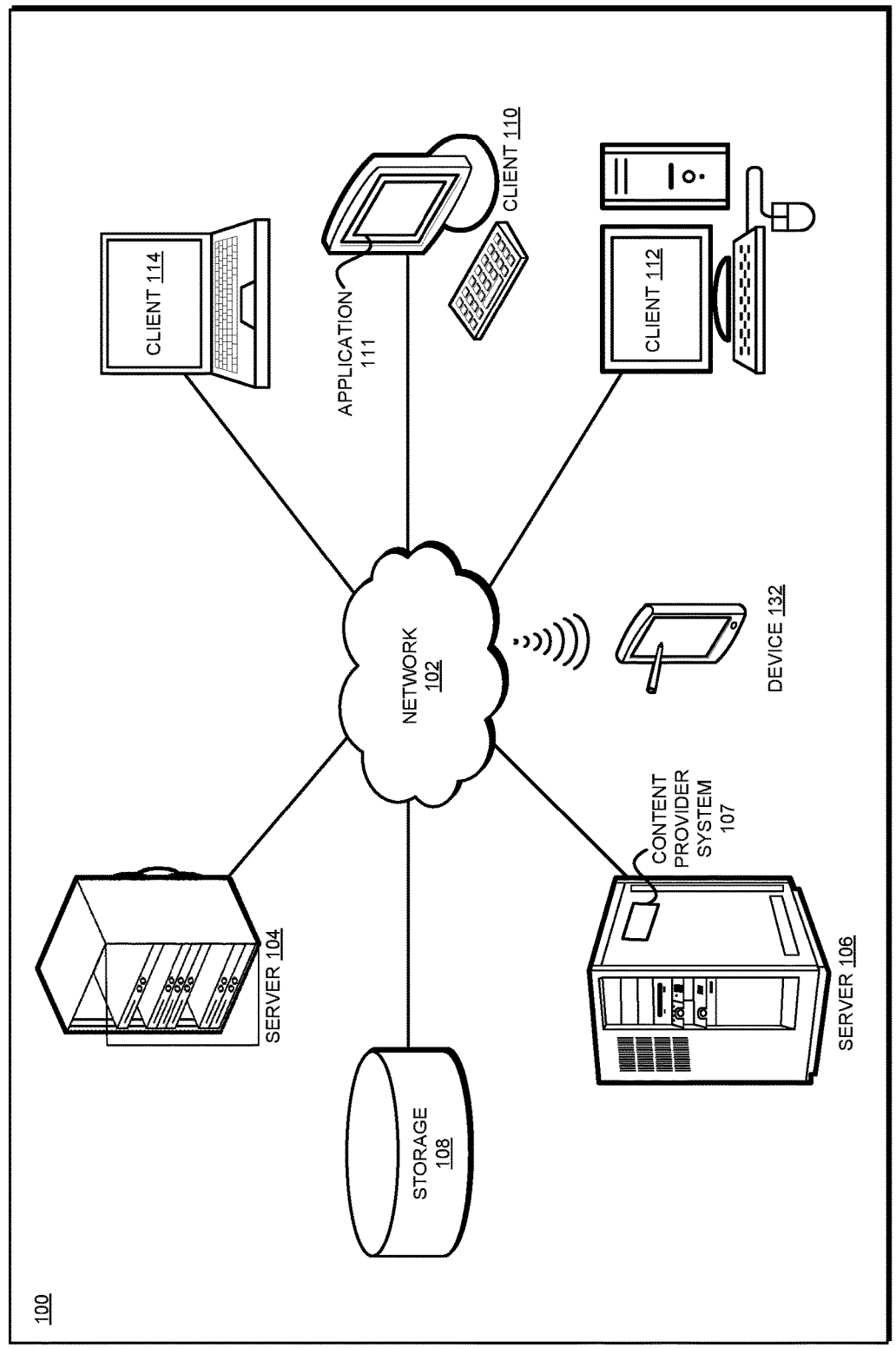
FIG. 1 depicts a block diagram of a network of data processing systems in which illustrative embodiments may be implemented.

The illustrative embodiments recognize that presently, a user who receives and uses the content is unable to select content based on the user's own preference for the contexts in the content. The user is limited to relying on somebody else's—particularly the producer's or a regulatory group's—determination of the rating values to associate with various contents in order to control which content should be accessed by the user or other users in the user's group, e.g., in the user's family.

The illustrative embodiments further recognize that the industry-wide rating system broadly applies a selected rating value to a large volume of content, such as an entire movie, an entire season of a television show, all occurrences of any content under a single title or category, and the like. As an example, the illustrative embodiments recognize that, it is possible—and quite commonly the case—that in a season of episodes, the content of certain episodes is acceptable for a child but certain other episodes may not. Yet, the same rating value applies to all episodes. Similarly, within an episode, certain portions of the episode may be acceptable for a certain user and other portions may not. Yet, a rating value applies to the entire episode.

Thus, not only is a user not in control of what rating value to apply to content, the user also has no control over how or why to apply a particular rating value, select different rating values than the industry-wide rating system, apply a rating value to portions of content smaller than the content apportionment adopted by the industry-wide rating system, or some combination thereof. For example, a user may want a child user in the family to see a portion of a television episode where children are portrayed as collaborating in a sport but not where the children are sharing food. Presently, there is no available way in which the user can determine or distinguish between the example collaboration in the sporting context of the content and the example collaboration in the eating context of the content.

The illustrative embodiments recognize that generally, a user is unable to specify the contexts that are acceptable to the user, find the occurrences of those contexts in a given content or a portion thereof, and selectively apply user-specified rating values to those occurrences. Furthermore, the user is not able to receive notification before actually receiving or using the content about those occurrences of acceptable contexts and their corresponding portions in the content.

The illustrative embodiments recognize that the presently available tools or solutions do not address these needs or provide adequate solutions for these needs. The illustrative embodiments used to describe the invention generally address and solve the above-described problems and other problems related to contextual alerting for broadcast content.

An embodiment can be implemented as a software application. The application implementing an embodiment can be configured as a modification of an existing content presentation system, as a separate application that operates in conjunction with an existing content presentation system, a standalone application, or some combination thereof.

An embodiment receives a specification of a contextual rating rule from a user. For example, the user may specify the contextual rating rule by speaking, typing, or otherwise inputting the rule into an embodiment using a natural language. A contextual rating rule is a condition under which a presence or an absence of a context in a portion of a content corresponds with a rating value specified by the user. For the example described earlier, some non-limiting examples of the contextual rating rules can be—if collaborative children's sporting activity is present in a portion of an episode, rate that portion a 5 on a 1-5 scale; if children sharing food items is present in a portion of an episode, rate that portion a 1 on a 1-5 scale; if collaborative children's sporting activity and food sharing are both present in a portion of an episode, rate that portion a 2 on the scale; and so on.

Generally, within the scope of the illustrative embodiments, any number or types of contexts can be specified in any suitable manner in any number of contextual rating rules. Any number of ratings, from any suitable user-selected rating scale or set of ratings can be applied by such rules. A rating according to a contextual rating rule can be applied to any portion of any size in a given content, to multiple portions in a content, to multiple portions in multiple contents, to multiple contents as a whole, or to some combination thereof.

Furthermore, an embodiment applies a contextual rating rule to a content after the content has already been transmitted by a content producer or distributor and after the transmitted content has been received by a user for storing or using the content upon receipt. Particularly, the embodiment applies a contextual rating rule after the receiving of the content and before the content is presented to the user.

In operation, a transmitted content is received, such as at a set-top box (STB) of the user. An embodiment performs a contextual analysis of the content. A contextual analysis analyzes various portions of the received content to determine the contexts present in those portions of the received content.

According to an embodiment, different portions of the content can be selected for contextual analysis. For example, a portion may be a segment of all or some components of the content—such as the audio, video, images, or speech, which appear in the foreground, in the background, or in the foreground and in the background of the content—spanning a period of time. As another example, a portion may be just one or some components of the content—such as the audio, video, images, or speech, which appear in the foreground, in the background, or in the foreground and in the background of the content—which span the entire content period or just a period of time within the total period of the content.

An embodiment applies one or more contextual rating rules to the determined contexts of the received content or a portion thereof. The embodiment computes a rating value corresponding to the one or more contexts that are applicable to a portion of the content and associates with such portion the computed rating value.

The illustrative embodiments further recognize that in some cases it may be advantageous to attract a user's attention towards certain portions of the content. For example, if the portion includes a sporting event, a child might be more inclined to watch the portion if the portion also includes an animated cartoon character on the screen while the portion is being presented on the screen. Note that the animation or the cartoon characters are not a part of the received content.

As another example, a portion pertaining to children eating healthy foods might benefit from including an animation of cartoon characters engaging in similar activities. Similarly, a portion pertaining to weather can attract additional attention of a user with animated clouds on the screen. Again, the animation, the characters engaging in the activity, or the cloud graphics are not included in the content that is originally received.

An embodiment uses a context of a portion to select an overlay. The overlay includes animations, supplemental information, graphics, and the like as described herein.

The information for the overlay is selected dynamically according to the context of the portion on which the information is overlaid. Different portions can be overlaid with different information.

Furthermore, the embodiment selects the information for the overlay in an y suitable manner. In one case, the information for the overlay may be selected based on the target user's past viewing habits or content usage habits. In another case, the information for the overlay may be selected from a pre-specified file. In another case, the information for the overlay may be selected dynamically from other information sources, such as a different cartoon content, a different news content, data from a different weather source, and many others. When that portion is presented, e.g., displayed on a television screen, the embodiment overlays the overlay information on the portion during the presentation.

In some cases, as the content is used, e.g., played on a television set, the user might desire a notification about an upcoming portion, the portion's context, and the portion's contextual rating that an embodiment has assigned. For example, a portion particularly suited for children might be coming up in five minutes during a playback and the user's children may not be present in the room. The user might want an advance notification so that the children can gather around the television to view that portion.

An embodiment constructs a notification message about a portion that has not yet been presented, or has not been reached yet in an ongoing presentation of the content. The notification can be presented in the same format or medium as the content or in a different manner. For example, if the content includes video, the notification can be audio, video, graphic, or text that can be presented with the video.

Alternatively, the notification can be delivered to a different device, such as wirelessly to a mobile phone while the content is configured for a television screen.

The manner of contextual alerting for broadcast content described herein is unavailable in the presently available methods. A method of an embodiment described herein, when implemented to execute on a device or data processing system, comprises substantial advancement of the functionality of that device or data processing system in allowing selective and custom contextual rating of variable portions of broadcast content upon receipt of such content by a user's device.

The illustrative embodiments are described with respect to certain types of content, ratings, portions, contexts, rules, overlays, notifications, presentation, devices, data processing systems, environments, components, and applications only as examples. Any specific manifestations of these and other similar artifacts are not intended to be limiting to the invention. Any suitable manifestation of these and other similar artifacts can be selected within the scope of the illustrative embodiments.

Furthermore, the illustrative embodiments may be implemented with respect to any type of data, data source, or access to a data source over a data network. Any type of data storage device may provide the data to an embodiment of the invention, either locally at a data processing system or over a data network, within the scope of the invention. Where an embodiment is described using a mobile device, any type of data storage device suitable for use with the mobile device may provide the data to such embodiment, either locally at the mobile device or over a data network, within the scope of the illustrative embodiments.

The illustrative embodiments are described using specific code, designs, architectures, protocols, layouts, schematics, and tools only as examples and are not limiting to the illustrative embodiments. Furthermore, the illustrative embodiments are described in some instances using particular software, tools, and data processing environments only as an example for the clarity of the description. The illustrative embodiments may be used in conjunction with other comparable or similarly purposed structures, systems, applications, or architectures. For example, other comparable mobile devices, structures, systems, applications, or architectures therefor, may be used in conjunction with such embodiment of the invention within the scope of the invention. An illustrative embodiment may be implemented in hardware, software, or a combination thereof.

The examples in this disclosure are used only for the clarity of the description and are not limiting to the illustrative embodiments. Additional data, operations, actions, tasks, activities, and manipulations will be conceivable from this disclosure and the same are contemplated within the scope of the illustrative embodiments.

Any advantages listed herein are only examples and are not intended to be limiting to the illustrative embodiments. Additional or different advantages may be realized by specific illustrative embodiments. Furthermore, a particular illustrative embodiment may have some, all, or none of the advantages listed above.

Figure 2:
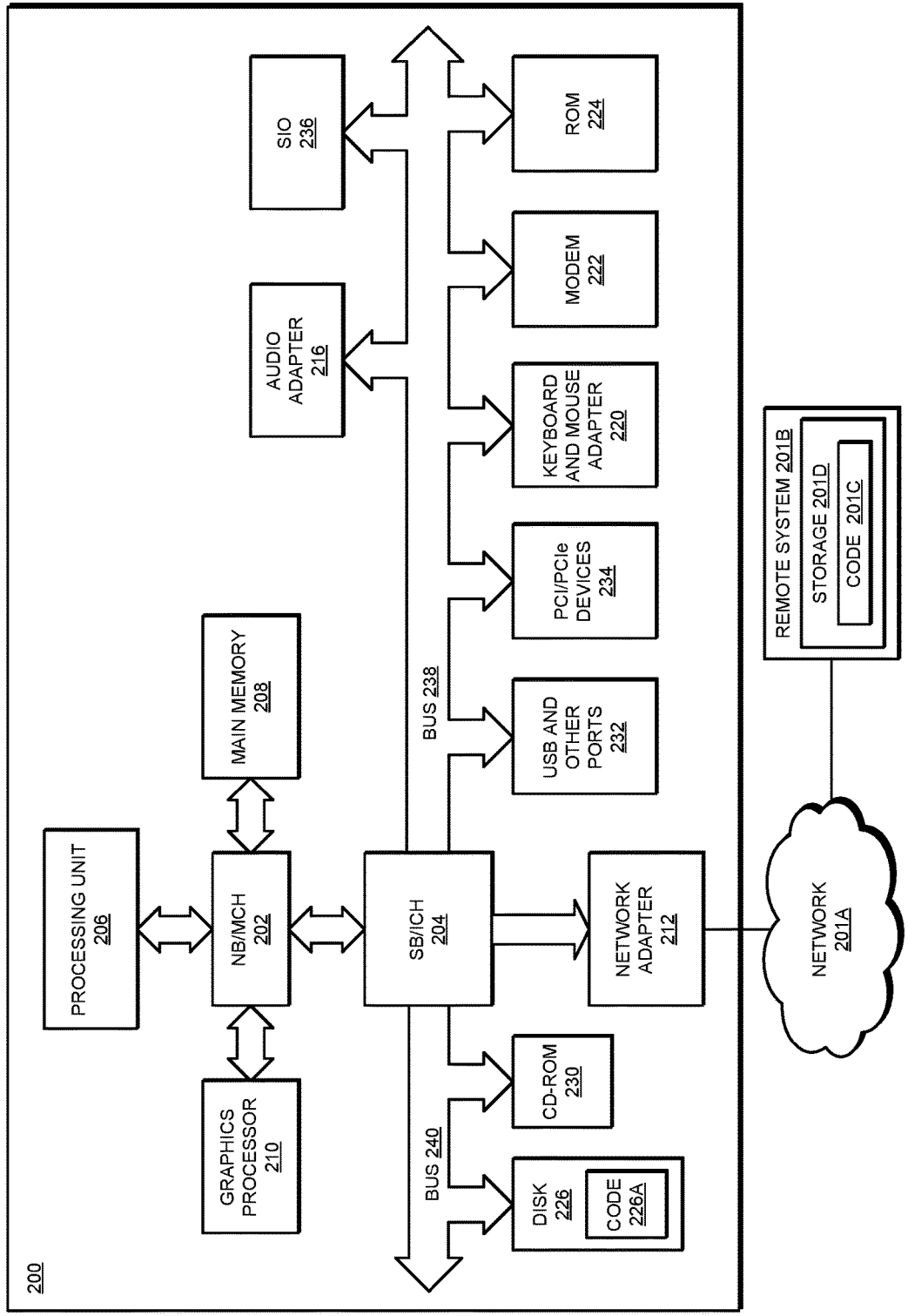
FIG. 2 depicts a block diagram of a data processing system in which illustrative embodiments may be implemented.

With reference to the figures and in particular with reference to FIGS. 1 and 2, these figures are example diagrams of data processing environments in which illustrative embodiments may be implemented. FIGS. 1 and 2 are only examples and are not intended to assert or imply any limitation with regard to the environments in which different embodiments may be implemented. A particular implementation may make many modifications to the depicted environments based on the following description.

FIG. 1 depicts a block diagram of a network of data processing systems in which illustrative embodiments may be implemented. Data processing environment 100 is a network of computers in which the illustrative embodiments may be implemented. Data processing environment 100 includes network 102. Network 102 is the medium used to provide communications links between various devices and computers connected together within data processing environment 100. Network 102 may include connections, such as wire, wireless communication links, or fiber optic cables.

Clients or servers are only example roles of certain data processing systems connected to network 102 and are not intended to exclude other configurations or roles for these data processing systems. Server 104 and server 106 couple to network 102 along with storage unit 108. Software applications may execute on any computer in data processing environment 100. Clients 110, 112, and 114 are also coupled to network 102. A data processing system, such as server 104 or 106, or client 110, 112, or 114 may contain data and may have software applications or software tools executing thereon.

Only as an example, and without implying any limitation to such architecture, FIG. 1 depicts certain components that are usable in an example implementation of an embodiment. For example, servers 104 and 106, and clients 110, 112, 114, are depicted as servers and clients only as example and not to imply a limitation to a client-server architecture. As another example, an embodiment can be distributed across several data processing systems and a data network as shown, whereas another embodiment can be implemented on a single data processing system within the scope of the illustrative embodiments. Data processing systems 104, 106, 110, 112, and 114 also represent example nodes in a cluster, partitions, and other configurations suitable for implementing an embodiment.

Device 132 is an example of a device described herein. For example, device 132 can take the form of a smartphone, a tablet computer, a laptop computer, client 110 in a stationary or a portable form, a wearable computing device, or any other suitable device. Any software application described as executing in another data processing system in FIG. 1 can be configured to execute in device 132 in a similar manner. Any data or information stored or produced in another data processing system in FIG. 1 can be configured to be stored or produced in device 132 in a similar manner.

Client 110 may be a user device, such as a STB or a recorder, that receives broadcast content from content provider system 107. Application 111 implements an embodiment described herein.

Servers 104 and 106, storage unit 108, and clients 110, 112, and 114 may couple to network 102 using wired connections, wireless communication protocols, or other suitable data connectivity. Clients 110, 112, and 114 may be, for example, personal computers or network computers.

In the depicted example, server 104 may provide data, such as boot files, operating system images, and applications to clients 110, 112, and 114. Clients 110, 112, and 114 may be clients to server 104 in this example. Clients 110, 112, 114, or some combination thereof, may include their own data, boot files, operating system images, and applications. Data processing environment 100 may include additional servers, clients, and other devices that are not shown.

In the depicted example, data processing environment 100 may be the Internet. Network 102 may represent a collection of networks and gateways that use the Transmission Control Protocol/Internet Protocol (TCP/IP) and other protocols to communicate with one another. At the heart of the Internet is a backbone of data communication links between major nodes or host computers, including thousands of commercial, governmental, educational, and other computer systems that route data and messages. Of course, data processing environment 100 also may be implemented as a number of different types of networks, such as for example, an intranet, a local area network (LAN), or a wide area network (WAN). FIG. 1 is intended as an example, and not as an architectural limitation for the different illustrative embodiments.

Among other uses, data processing environment 100 may be used for implementing a client-server environment in which the illustrative embodiments may be implemented. A client-server environment enables software applications and data to be distributed across a network such that an application functions by using the interactivity between a client data processing system and a server data processing system. Data processing environment 100 may also employ a service oriented architecture where interoperable software components distributed across a network may be packaged together as coherent business applications.

With reference to FIG. 2, this figure depicts a block diagram of a data processing system in which illustrative embodiments may be implemented. Data processing system 200 is an example of a computer, such as servers 104 and 106, or clients 110, 112, and 114 in FIG. 1, or another type of device in which computer usable program code or instructions implementing the processes may be located for the illustrative embodiments.

Data processing system 200 is also representative of a data processing system or a configuration therein, such as data processing system 132 in FIG. 1 in which computer usable program code or instructions implementing the processes of the illustrative embodiments may be located. Data processing system 200 is described as a computer only as an example, without being limited thereto. Implementations in the form of other devices, such as device 132 in FIG. 1, may modify data processing system 200, such as by adding a touch interface, and even eliminate certain depicted components from data processing system 200 without departing from the general description of the operations and functions of data processing system 200 described herein.

In the depicted example, data processing system 200 employs a hub architecture including North Bridge and memory controller hub (NB/MCH) 202 and South Bridge and input/output (I/O) controller hub (SB/ICH) 204. Processing unit 206, main memory 208, and graphics processor 210 are coupled to North Bridge and memory controller hub (NB/MCH) 202. Processing unit 206 may contain one or more processors and may be implemented using one or more heterogeneous processor systems. Processing unit 206 may be a multi-core processor. Graphics processor 210 may be coupled to NB/MCH 202 through an accelerated graphics port (AGP) in certain implementations.

In the depicted example, local area network (LAN) adapter 212 is coupled to South Bridge and I/O controller hub (SB/ICH) 204. Audio adapter 216, keyboard and mouse adapter 220, modem 222, read only memory (ROM) 224, universal serial bus (USB) and other ports 232, and PCI/PCIe devices 234 are coupled to South Bridge and I/O controller hub 204 through bus 238. Hard disk drive (HDD) or solid-state drive (SSD) 226 and CD-ROM 230 are coupled to South Bridge and I/O controller hub 204 through bus 240. PCI/PCIe devices 234 may include, for example, Ethernet adapters, add-in cards, and PC cards for notebook computers. PCI uses a card bus controller, while PCIe does not. ROM 224 may be, for example, a flash binary input/output system (BIOS). Hard disk drive 226 and CD-ROM 230 may use, for example, an integrated drive electronics (IDE), serial advanced technology attachment (SATA) interface, or variants such as external-SATA (eSATA) and micro-SATA (mSATA). A super I/O (SIO) device 236 may be coupled to South Bridge and I/O controller hub (SB/ICH) 204 through bus 238.

Memories, such as main memory 208, ROM 224, or flash memory (not shown), are some examples of computer usable storage devices. Hard disk drive or solid state drive 226, CD-ROM 230, and other similarly usable devices are some examples of computer usable storage devices including a computer usable storage medium.

An operating system runs on processing unit 206. The operating system coordinates and provides control of various components within data processing system 200 in FIG. 2. The operating system may be a commercially available operating system for any type of computing platform, including but not limited to server systems, personal computers, and mobile devices. An object oriented or other type of programming system may operate in conjunction with the operating system and provide calls to the operating system from programs or applications executing on data processing system 200.

Instructions for the operating system, the object-oriented programming system, and applications or programs, such as application 105 in FIG. 1, are located on storage devices, such as in the form of code 226A on hard disk drive 226, and may be loaded into at least one of one or more memories, such as main memory 208, for execution by processing unit 206. The processes of the illustrative embodiments may be performed by processing unit 206 using computer implemented instructions, which may be located in a memory, such as, for example, main memory 208, read only memory 224, or in one or more peripheral devices.

Furthermore, in one case, code 226A may be downloaded over network 201A from remote system 201B, where similar code 201C is stored on a storage device 201D. in another case, code 226A may be downloaded over network 201A to remote system 201B, where downloaded code 201C is stored on a storage device 201D.

The hardware in FIGS. 1-2 may vary depending on the implementation. Other internal hardware or peripheral devices, such as flash memory, equivalent non-volatile memory, or optical disk drives and the like, may be used in addition to or in place of the hardware depicted in FIGS. 1-2. In addition, the processes of the illustrative embodiments may be applied to a multiprocessor data processing system.

In some illustrative examples, data processing system 200 may be a personal digital assistant (PDA), which is generally configured with flash memory to provide non-volatile memory for storing operating system files and/or user-generated data. A bus system may comprise one or more buses, such as a system bus, an I/O bus, and a PCI bus. Of course, the bus system may be implemented using any type of communications fabric or architecture that provides for a transfer of data between different components or devices attached to the fabric or architecture.

A communications unit may include one or more devices used to transmit and receive data, such as a modem or a network adapter. A memory may be, for example, main memory 208 or a cache, such as the cache found in North Bridge and memory controller hub 202. A processing unit may include one or more processors or CPUs.

The depicted examples in FIGS. 1-2 and above-described examples are not meant to imply architectural limitations. For example, data processing system 200 also may be a tablet computer, laptop computer, or telephone device in addition to taking the form of a mobile or wearable device.

Where a computer or data processing system is described as a virtual machine, a virtual device, or a virtual component, the virtual machine, virtual device, or the virtual component operates in the manner of data processing system 200 using virtualized manifestation of some or all components depicted in data processing system 200. For example, in a virtual machine, virtual device, or virtual component, processing unit 206 is manifested as a virtualized instance of all or some number of hardware processing units 206 available in a host data processing system, main memory 208 is manifested as a virtualized instance of all or some portion of main memory 208 that may be available in the host data processing system, and disk 226 is manifested as a virtualized instance of all or some portion of disk 226 that may be available in the host data processing system. The host data processing system in such cases is represented by data processing system 200.

Figure 3:
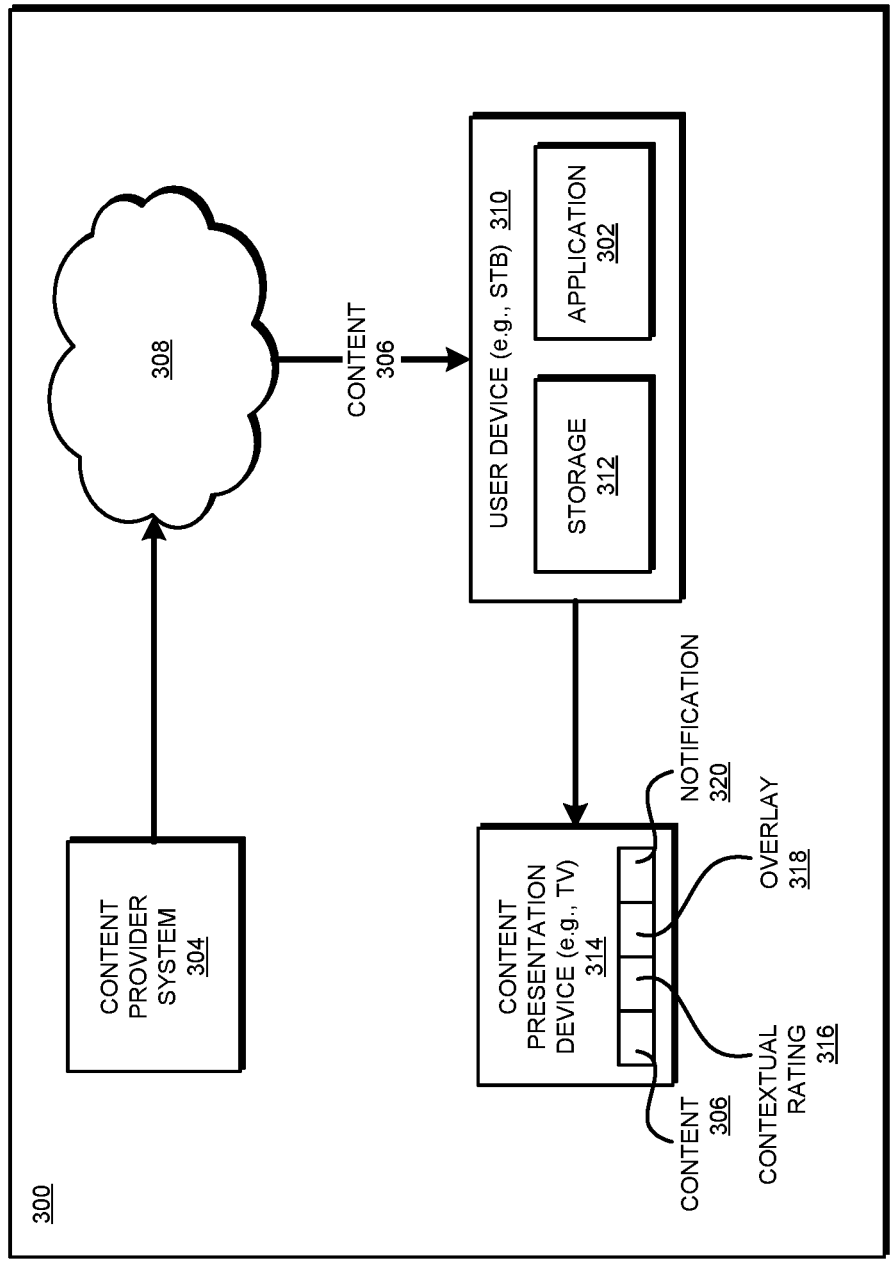
FIG. 3 depicts a block diagram of an example configuration for contextual alerting for broadcast content in accordance with an illustrative embodiment.

With reference to FIG. 3, this figure depicts a block diagram of an example configuration for contextual alerting for broadcast content in accordance with an illustrative embodiment. Application 302 is an example of application 111 in FIG. 1. Content provider system 304 is an example of content provider system 107 in FIG. 1.

Content provider system 304 provides content 306 over network 308. Network 308 is an example of network 102 in FIG. 1. Content 306 may or may not be rated according to some prior-art industry-wide content rating system.

Device 310 is a user's device used to receive broadcast content, such as content 306. Device 310 is an example of client 110 in FIG. 1. Device 310 may, but need not necessarily, include storage 312. For example, storage 312 may be accessible from device 310 without device 310 including storage 312. Storage 312 is configured to store received broadcast of content 306.

Application 302 performs contextual analysis, contextual rating, overlaying of information, notification, or some combination of these and other operations described herein. Application 302 causes content 306 to be presented on content presentation device 314, e.g., a television set or a monitor. The presentation on device 314 includes content 306, contextual rating 316, overlay 318, notification 320, or some combination thereof. Different portions of the presentation can be presented differently on device 314. For example, the presentation of rating 316, overlay 318, and/or notification 320 may be in a manner that is similar to or different from the manner in which content 306 is presented.

Figure 4:
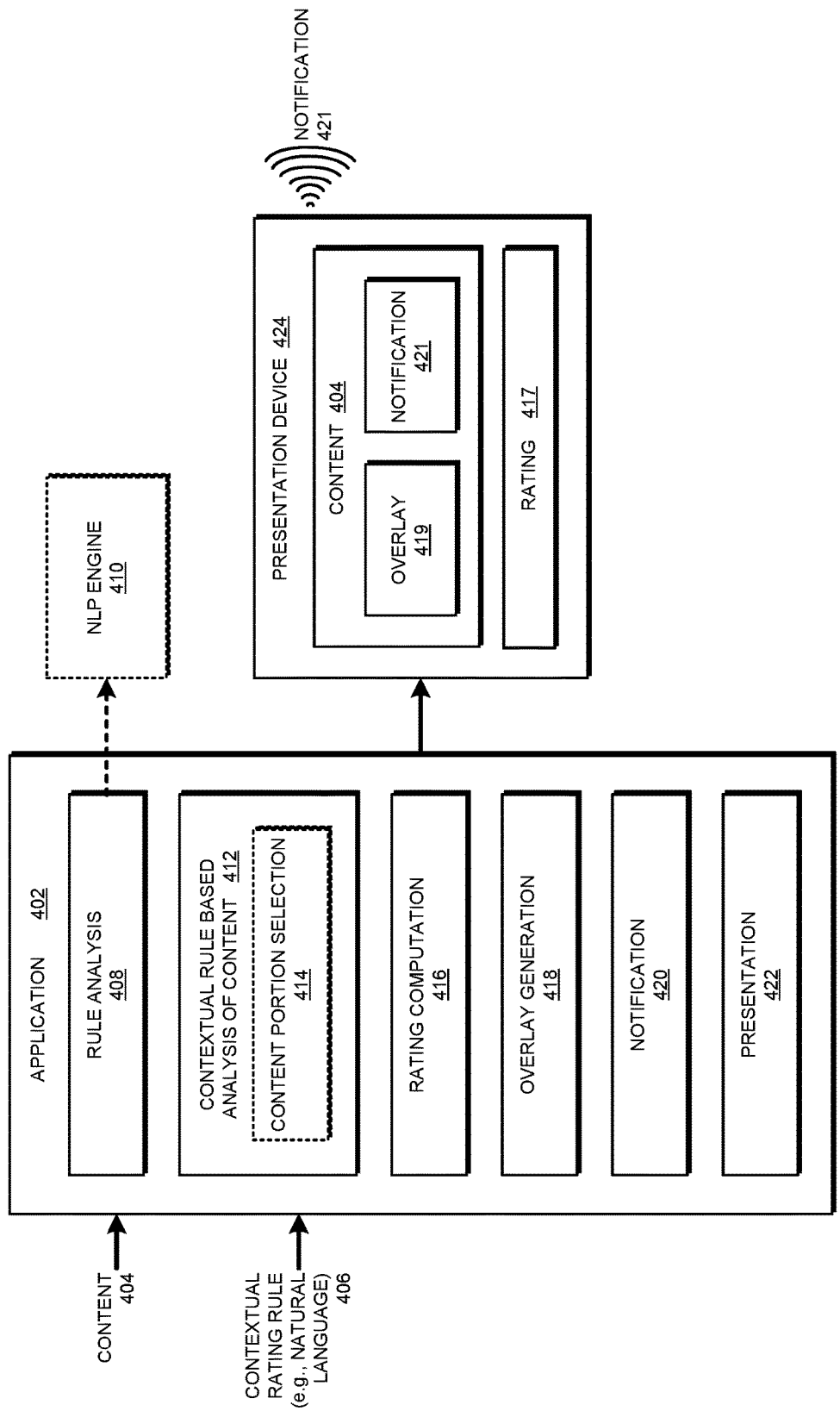
FIG. 4 depicts a block diagram of a detailed configuration for contextual alerting for broadcast content in accordance with an illustrative embodiment.

With reference to FIG. 4, this figure depicts a block diagram of a detailed configuration for contextual alerting for broadcast content in accordance with an illustrative embodiment. Application 402 is an example of application 302 in FIG. 3. Content 404 is an example of content 306 as sent by content provider system 304 in FIG. 3.

A user inputs one or more contextual rating rule 406. Component 408 analyzes rule 406 to determine one or more contexts, one or more conditions, and one or more rating values specified in rule 406. As a non-limiting example, rule 406 may be input in a natural language, and component 408 may use the natural language Processing (NLP) engine 410 to parse the natural language input for the analysis. NLP engine 410 may be local in the device where application 402 is executing or may be remotely available to application 402 over a data network. From such an analysis, component 408 constructs a machine executable contextual rating rule from input rule 406.

Component 412 performs a contextual analysis of content 404. Subcomponent 414 selects a portion of component 404 in any of the various manners described herein. Component 412 identifies one or more contexts present in a selected portion of content 404.

Component 416 applies one or more machine executable contextual rating rules—as produced by component 408—to an identified context of a portion—as produced by component 414. From the application of one or more machine executable contextual rating rule to a portion of content 404 in this manner, component 416 computes a rating value that should be associated with the portion of content 404. The rating value is presentable as rating 417 on presentation device 424.

Using a context of the portion of content 404, component 418 obtains overlay information in any manner described herein. Component 418 produces an overlay with the obtained information. The overlay is presentable as overlay 419 on presentation device 424.

Component 420 generates a notification about a contextual rating associated with the portion prior to a time when the portion is presented to the user. The notification is presentable as notification 421 on presentation device 424.

In one embodiment, component 420 may receive an image input from a camera that is observing the audience, and component 420 may analyze the image to determine that a desired audience, such as children, are not present in the audience. The production of the notification can be subject to such determinations. In other words, a notification is not produced when the desired audience for the portion is already attentive to the presentation, otherwise a notification is produced to attract the desired audience's attention to the presentation in advance of presenting the portion.

Component 422 presents rating 417, overlay 419, notification 421, or some combination thereof in conjunction with content 404 on presentation device 424. Depending on the form in which notification 421 is constructed, presentation device 424 may present notification 421 using a suitable output method.

Figure 5:
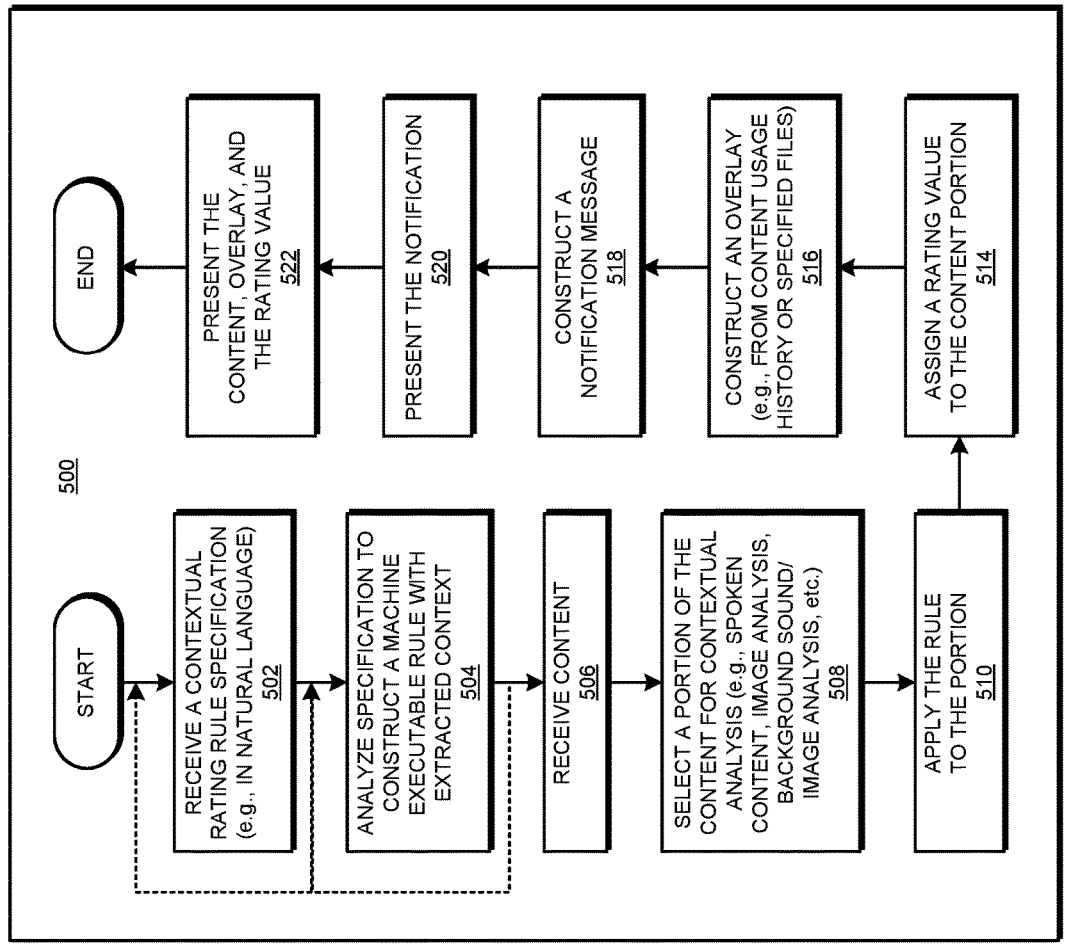
FIG. 5 a flowchart of an example process for contextual alerting for broadcast content in accordance with an illustrative embodiment depicts.

With reference to FIG. 5, this figure depicts a flowchart of an example process for contextual alerting for broadcast content in accordance with an illustrative embodiment. Process 500 can be implemented in application 402 in FIG. 4.

The application receives a contextual rating rule specification, such as input 406 in FIG. 4 (block 502). The application analyzes the specification to construct a machine executable contextual rating rule for one or more contexts extracted from the specification (block 504). The application processes one or more specifications in this manner to construct one or more rules in this manner.

The application receives broadcast content (block 506). The application selects a portion of the content for contextual analysis (block 508). The application selects and applies one or more of the machine executable rules constructed in block 504 to the portion according to a context found in the portion (block 510).

The application assigns a contextual rating value to the portion according to the applied rule or rules (block 514). The application repeats the portion selection, contextual analysis, rule application, and rating value assignment operations for any number of portions in the content.

For a portion that has been analyzed and rated in this manner, the application obtains a suitable overlay information and constructs an overlay in a manner described herein (block 516). Depending on the implementation, broadcast content, or both, some, all, or none of the portions may receive such an overlay.

For a contextually rated portion, the application constructs a notification (block 518). Again, depending on the implementation, broadcast content, the circumstances of a content presentation, the audience present at the presentation, or some combination thereof, some, all, or none of the portions may cause such a notification to be generated. When a notification is generated for a portion, the application presents the notification suitably timed ahead of the presentation of the portion (block 520). When the portion is presented to the user, the application presents the overlay and/or the rating value corresponding to that portion as well (block 522). The application ends process 500 thereafter.

Thus, a computer implemented method, system or apparatus, and computer program product are provided in the illustrative embodiments for contextual alerting for broadcast content and other related features, functions, or operations. Where an embodiment or a portion thereof is described with respect to a type of device, the computer implemented method, system or apparatus, the computer program product, or a portion thereof, are adapted or configured for use with a suitable and comparable manifestation of that type of device.

Where an embodiment is described as implemented in an application, the delivery of the application in a Software as a Service (SaaS) model is contemplated within the scope of the illustrative embodiments. In a SaaS model, the capability of the application implementing an embodiment is provided to a user by executing the application in a cloud infrastructure. The user can access the application using a variety of client devices through a thin client interface such as a web browser (e.g., web-based e-mail), or other light-weight client-applications. The user does not manage or control the underlying cloud infrastructure including the network, servers, operating systems, or the storage of the cloud infrastructure. In some cases, the user may not even manage or control the capabilities of the SaaS application. In some other cases, the SaaS implementation of the application may permit a possible exception of limited user-specific application configuration settings.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

What is claimed is:

1. A method comprising:
analyzing, after receiving a content at a device usable to present the content to a user, a portion of the received content to identify a context present in the portion, the context comprising a type of a subject-matter of the portion;
selecting, corresponding to the context of the portion, a contextual rating rule from a set of contextual rating rules;
computing a rating value of the portion using a first rating value in the contextual rating rule, the rating value of the portion being distinct from a rating associated with the content by a distributor of the content;
presenting, on a presentation device, the portion with the rating value of the portion;
collecting information related to the context of the portion;
constructing an overlay with the information, wherein the information is configured in the overlay to attract an attention of the user to the portion, and wherein the information for the overlay is selected based on content usage habits of the user;
overlaying the portion with the overlay during the presentation of the portion;
determining that the portion has not yet been presented during a presentation of the content on the presentation device;
constructing a notification, the notification comprising the rating value of the portion;
receiving an image of the user during the presenting;
analyzing the image to determine that the user is not attentive during the presenting; and
sending a notification to the user prior to presenting the portion on the presentation device responsive to determining that the user is not attentive during the presenting.

2. The method of claim 1, further comprising:
analyzing the image to determine whether a second user is absent in the image, wherein the context of the portion is of interest to the second user, wherein the sending of the notification occurs responsive to the second user being absent in the image.

3. The method of claim 1, further comprising:
applying a second contextual rating rule having a second rating value, wherein the rating value of the portion is a function of the first rating value and the second rating value.

4. The method of claim 1, further comprising:
receiving from a user of the content a specification in a natural language;
processing the specification via Natural Language Processing (NLP) to extract the context, a condition, and the first rating value; and
constructing the contextual rating rule using the context, the condition, and the first rating value.

5. The method of claim 1, further comprising:
selecting the portion from the content, wherein the portion comprises a type of data in the content.

6. The method of claim 5, wherein the type of data comprises audio data of a speech, the speech spanning a fraction of a total time period span of the content.

7. The method of claim 5, wherein the type of data comprises video data, the video data spanning a fraction of a total time period span of the content.

8. The method of claim 5, wherein the type of data comprises data about a background artifact in the content, the background artifact data spanning a fraction of a total time period span of the content.

9. The method of claim 1, wherein the content is received as a broadcast from a content provider system.

10. A computer usable program product comprising one or more computer-readable storage devices, and program instructions stored on at least one of the one or more storage devices, the stored program instructions comprising:
program instructions to analyze, after receiving a content at a device usable to present the content to a user, a portion of the received content to identify a context present in the portion, the context comprising a type of a subject-matter of the portion;
program instructions to select, corresponding to the context of the portion, a contextual rating rule from a set of contextual rating rules;
program instructions to compute a rating value of the portion using a first rating value in the contextual rating rule, the rating value of the portion being distinct from a rating associated with the content by a distributor of the content;
program instructions to present, on a presentation device, the portion with the rating value of the portion;
program instructions to collect information related to the context of the portion;
program instructions to construct an overlay with the information, wherein the information is configured in the overlay to attract an attention of the user to the portion, and wherein the information for the overlay is selected based on content usage habits of the user;

program instructions to overlay the portion with the overlay during a presentation of the portion;

program instructions to determine that the portion has not yet been presented during a presentation of the content on the presentation device;

program instructions to construct a notification, the notification comprising the rating value of the portion;

program instructions to receive an image of the user during the presenting;

program instructions to analyze the image to determine that the user is not attentive during the presenting; and program instructions to send a notification to the user prior to presenting the portion on the presentation device responsive to determining that the user is not attentive during the presenting.

11. The computer usable program product of claim 10, further comprising:

program instructions to analyze the image to determine whether a second user is absent in the image, wherein the context of the portion is of interest to the second user, wherein the sending of the notification occurs responsive to the second user being absent in the image.

12. The computer usable program product of claim 10, further comprising:

program instructions to apply a second contextual rating rule having a second rating value, wherein the rating value of the portion is a function of the first rating value and the second rating value.

13. The computer usable program product of claim 10, further comprising:

program instructions to receive from a user of the content a specification in a natural language;

program instructions to process the specification via Natural Language Processing (NLP) to extract the context, a condition, and the first rating value; and program instructions to construct the contextual rating rule using the context, the condition, and the first rating value.

14. The computer usable program product of claim 10, wherein the computer usable code is stored in a computer readable storage device in a data processing system, and wherein the computer usable code is transferred over a network from a remote data processing system.

15. The computer usable program product of claim 10, wherein the computer usable code is stored in a computer readable storage device in a server data processing system, and wherein the computer usable code is downloaded over a network to a remote data processing system for use in a computer readable storage device associated with the remote data processing system.

16. A computer system comprising one or more processors, one or more computer-readable memories, and one or more computer-readable storage devices, and program instructions stored on at least one of the one or more storage devices for execution by at least one of the one or more processors via at least one of the one or more memories, the stored program instructions comprising:

program instructions to analyze, after receiving a content at a device usable to present the content to a user, a portion of the received content to identify a context present in the portion, the context comprising a type of a subject-matter of the portion;

program instructions to select, corresponding to the context of the portion, a contextual rating rule from a set of contextual rating rules;

program instructions to compute a rating value of the portion using a first rating value in the contextual rating rule, the rating value of the portion being distinct from a rating associated with the content by a distributor of the content;

program instructions to present, on a presentation device, the portion with the rating value of the portion;

program instructions to collect information related to the context of the portion;

program instructions to construct an overlay with the information, wherein the information is configured in the overlay to attract an attention of the user to the portion, and wherein the information for the overlay is selected based on content usage habits of the user;

program instructions to overlay the portion with the overlay during a presentation of the portion;

program instructions to determine that the portion has not yet been presented during a presentation of the content on the presentation device;

program instructions to construct a notification, the notification comprising the rating value of the portion;

program instructions to receive an image of the user during the presenting;

program instructions to analyze the image to determine that the user is not attentive during the presenting; and program instructions to send a notification to the user prior to presenting the portion on the presentation device responsive to determining that the user is not attentive during the presenting.

\* \* \* \* \*